United States Patent Office 3,304,331
Patented Feb. 14, 1967

3,304,331
PROCESS FOR CHLORINATION OF
DIMETHYLSULFOXIDE
Charles Di Santo, Mount Vernon, N.Y., assignor to Stauffer Chemical Company, New York, N.Y., a corporation of Delaware
No Drawing. Filed Aug. 28, 1963, Ser. No. 305,203
3 Claims. (Cl. 260—607)

This application is a continuation-in-part of application Serial No. 165,237 filed January 9, 1962, now abandoned.

This invention pertains to the halogenation of dimethylsulfoxide by means of an alkali metal hypohalite. In particular, the invention is directed to a new and novel method for the preparation of bis(trichloromethyl)sulfone by the chlorination and oxidation of dimethylsulfoxide with alkali metal hypochlorite as the chlorinating agent.

Bis(trichloromethyl)sulfone is a known compound recognized for its valuable and useful biocidal properties in which connection it has been found effective against such diverse pest organisms as tribolium and milkweed bugs. However, the compound is especially noteworthy as a herbicidal agent, being particularly efficacious for the control of grasses and similar plant life. Bis(trichloromethyl)sulfone, which melts in the neighborhood of 35–40° C., is also useful as a solvent and is capable of dissolving a variety of liquid and solid organic compounds.

The preparation of bis(trichloromethyl)sulfone as presently practiced in the art, involves the oxidation and chlorination of thiodiglycolic acid by means of an alkali metal hypochlorite. Exemplary of this reaction is the process described in U.S. Patent 2,628,982 in which thiodiglycolic acid is treated with sodium hypochlorite in aqueous media. It is, moreover, recommended that an excess of the hypochlorite be employed. According to an article concerning halogenated sulfones published in the J.C.S., 508 (1956), the method of the U.S. patent also requires that the pH of the reaction be carefully adjusted and maintained. For a fuller discussion on the preparation of bis(trichloromethyl)sulfone by the hypochlorite halogenation and oxidation of thiodiglycolic acid, reference is made to the aforementioned citations and to British Patent 728,969.

As above pointed out, the production of bis(trichloromethyl)sulfone as typically practiced in the art requires that the reaction conditions be carefully controlled, specifically that the pH be held to close tolerances. Whereas this imposes no particular difficulties from the standpoint of laboratory preparations, such critical reaction conditions can be troublesome and costly to maintain when operations are conducted at the commercial level. Furthermore, thiodiglycolic acid, which constitutes the essential starting material of the prior art processes, is a relatively expensive chemical intermediate, not generally suitable for large scale chemical manufacturing.

Since the demand for bis(trichloromethyl)sulfone has risen markedly, particularly in the area of pesticides, there is a manifest need for an economical and commercially feasible process by which the production of this highly important chlorinated sulfone can be realized.

In accordance with the present invention, it has been discovered that bis(trichloromethyl)sulfone is formed in high yield and in excellent purity by treating dimethylsulfoxide with an alkali metal hypochlorite, e.g. sodium or potassium hypochlorite, in aqueous media and under neutral to alkaline conditions whereby all of the hydrogen atoms of the dimethylsulfoxide are replaced by chlorine atoms while at the same time the sulfoxide function is oxidized to a sulfone. An alkaline reaction medium is provided by using an alkali metal hydroxide such as the hydroxide of lithium, sodium or potassium.

In carrying out the method of the invention, superior results are obtained when the alkali metal hypochlorite is employed in excess. Since one mole of alkali metal hypochlorite is required to effect replacement of one alpha hydrogen atom with chlorine, it thus follows that the theoretical quantity of hypochlorite required to bring about total chlorination amounts to six moles. The oxidation of the sulfoxide function to the corresponding sulfone likewise consumes one mole of alkali metal hypochlorite. Therefore, the theoretical amount of hypochlorite to bring about both oxidation of the sulfoxide and total chlorination amounts to seven moles. However, it has been my experience that it is preferable to employ an excess of the hypochlorite, that is, a quantity in excess of seven moles and in this connection highly satisfactory results were obtained using 80 to 100 percent excess of the chlorinating agent. It has, moreover, been ascertained that the preparation of the bis(trichloromethyl)sulfone is greatly facilitated by resorting to moderately elevated temperatures, and in this connection, conducting the reaction at the reflux temperature of the aqueous media is especially convenient and satisfactory. Thus, whereas dimethylsulfoxide when reacted with excess sodium hypochlorite at refluxing temperatures produced an 80% yield of bis(trichloromethyl)sulfone in one hour, a comparable yield was obtained only after eighteen days when the reaction was allowed to proceed at substantially room temperatures.

The isolation of bis(trichloromethyl)sulfone is accomplished by resorting to methods well known to the organic chemistry art. For instance, because oef its low melting point, 37° C., the chlorinated sulfone normally separates from the reaction mixture as a heavy oil which is easily removed from the aqueous media and conveniently purified by distillation. However, the crude product is sufficiently pure for most purposes.

Reference is now made to the following examples which are inserted for the purpose of illustrating the invention in greater detail. It is to be pointed out, however, that different modifications in practicing the invention will be evident to those skilled in the art without departing from the spirit or scope of the said invention.

EXAMPLE 1

Bis(trichloromethyl)sulfone

$CCl_3$—$SO_2$—$CCl_3$ 4.0 g. (0.05 mole) of dimethylsulfoxide was mixed with 320 ml. (0.6 mole) of 13% sodium hypochlorite and the resulting mixture refluxed for a period of one hour. On cooling the reaction mixture, there was obtained 12.1 g. or 80% of bis(trichloromethyl)sulfone having a melting point of 36.6–37.0° C.

EXAMPLE 2

The procedure as given in Example 1 was again carried out excepting the bis(trichloromethyl)sulfone was isolated by steam distillation. The yield of product amounted to 60%.

I claim:
1. A process of preparing bis(trichloromethyl)sulfone which comprises reacting dimethylsulfoxide in aqueous media under substantially neutral to alkaline conditions with sufficient alkali metal hypochlorite whereby total chlorination of all the hydrogen atoms is effected while causing oxidation of the sulfoxide function to a sulfone and isolating the so formed bis(trichloromethyl)sulfone.

2. A process according to claim 1 wherein the alkali metal hypochlorite is sodium hypochlorite.

3. A process of preparing bis(trichloromethyl)sulfone which comprises reacting dimethylsulfoxide in aqueous media under substantially neutral to alkaline conditions with an excess of sodium hypochlorite the reaction being carried out at reflux and isolating the so formed bis(trichloromethyl)sulfone.

References Cited by the Examiner

UNITED STATES PATENTS 3,051,757  7/1962  Johnston et al. _____ 260—607
3,094,455  6/1963  Allen et al. _____ 260—607 XR

OTHER REFERENCES

Sneed et al.: "Comprehensive Inorganic Chemistry," vol. III, pages 152–156. QD151S66.

CHARLES B. PARKER, *Primary Examiner.*

DELBERT R. PHILLIPS, *Assistant Examiner.*